W. KIDMAN, Jr.
WEED CUTTER AND PULVERIZING MACHINE.
APPLICATION FILED MAY 19, 1915.
1,167,645.
Patented Jan. 11, 1916.
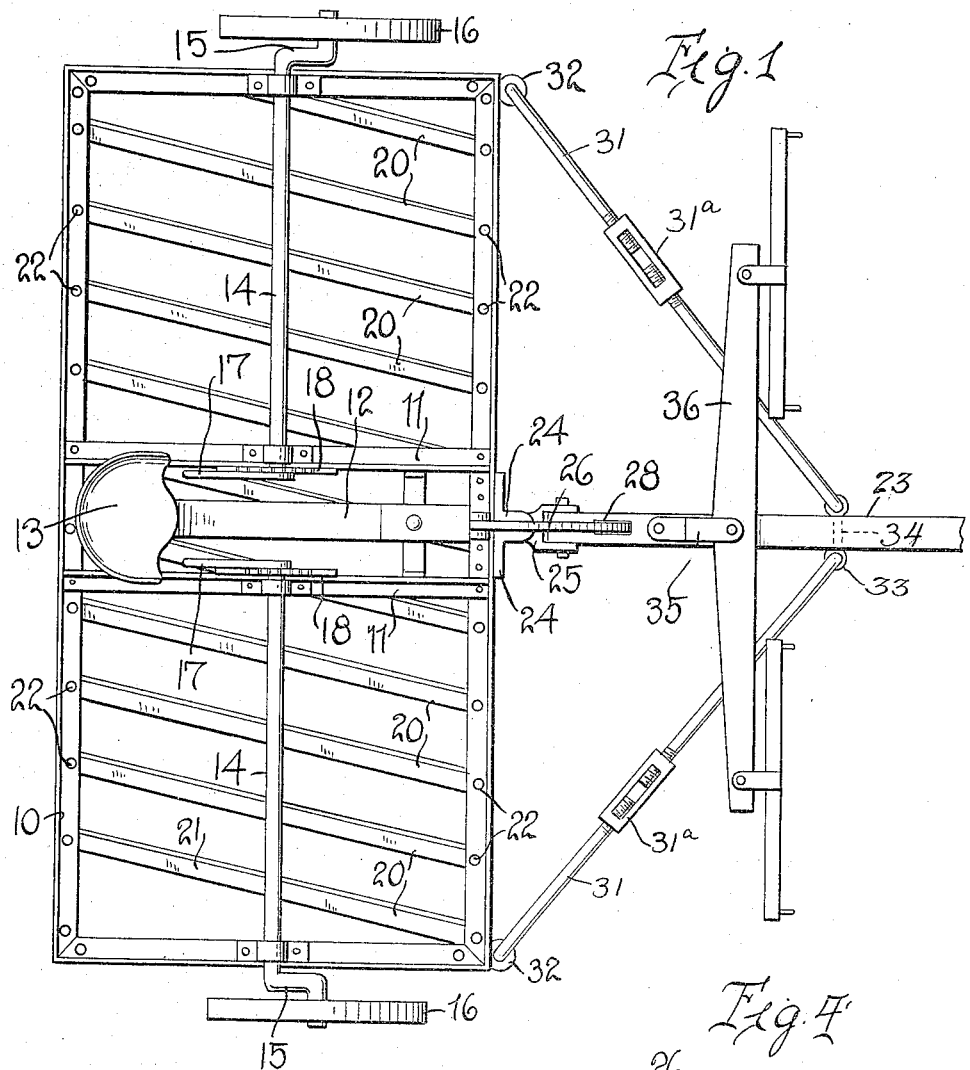
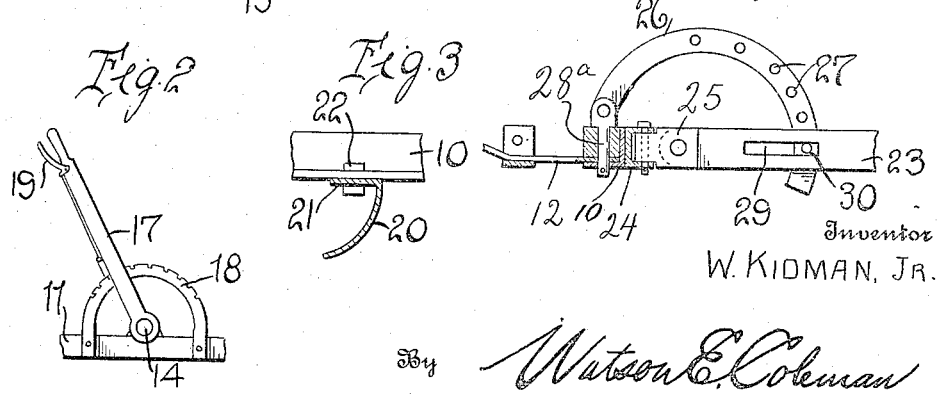
Inventor
W. KIDMAN, Jr.
By Watson E. Coleman
Attorney

UNITED STATES PATENT OFFICE.

WILLIAM KIDMAN, JR., OF MENDON, UTAH.

WEED-CUTTER AND PULVERIZING-MACHINE.

1,167,645.  Specification of Letters Patent.  Patented Jan. 11, 1916.

Application filed May 19, 1915. Serial No. 29,134.

*To all whom it may concern:*

Be it known that I, WILLIAM KIDMAN, Jr., a citizen of the United States, residing at Mendon, in the county of Cache and State of Utah, have invented certain new and useful Improvements in Weed-Cutters and Pulverizing-Machines, of which the following is a specification, reference being had to the accompanying drawings.

My invention relates to agricultural implements, and particularly to a combined weed cutter and ground pulverizer.

The primary object of my invention is the provision of a machine of the character above stated, so constructed as to be very effective in working the soil, pulverizing and cutting the weeds therein.

A further object of the invention in this connection is to provide a machine with a plurality of cutting or ground engaging blades arranged at a slight inclination to the line of draft, these blades being so arranged that the rear of one blade is directly behind the forward end of the next adjacent blade on one side so that every particle of the ground traversed by the machine will be submitted to the action of these pulverizing and weed cutting blades.

A further object of the invention is the provision of a machine of this character having a blade supporting frame so mounted that it may be inclined laterally or so that the frame may be bodily raised or lowered to any desired extent.

A further object of the invention is the provision of a machine of this character in which the tongue is pivotally connected to the supporting frame, and means provided for raising or lowering the frame. Means may also be provided whereby the inclination of the tongue with relation to the frame may be adjusted.

Other objects will appear in the course of the following description.

My invention is illustrated in the accompanying drawings, wherein:

Figure 1 is a plan view; Fig. 2 is a side elevation of the means for operating the shafts 14; Fig. 3 is an elevation of part of the frame, the blade being in section; Fig. 4 is a sectional elevation of the frame and tongue.

Referring to these drawings, 10 designates a frame which forms the body of the machine and which is preferably rectangular. This frame is preferably made of angle iron and comprises forward and rear members and end members. The forward and rear members are connected and braced adjacent the middle of the frame by means of the transverse angle iron braces 11 which are spaced a suitable distance from each other. Disposed within this space, that is, between these braces 11, is the seat support 12 carrying the seat 13. Rotatably mounted in each of the braces 11 and the corresponding end members of the frame are the shafts 14 which shafts are supported in suitable bearings, and at the outer end each shaft is cranked as at 15, and mounted upon the cranked end of each shaft is the supporting wheel 16.

Attached to the inner end of each of the shafts 14 is an operating lever 17 which operates over an arcuate rack or sector 18 and has a suitable spring actuated detent engageable with the rack, this detent being withdrawn to an inoperative position by means of the hand lever 19. By shifting these levers 17 in one direction or the other, the wheels may be raised or lowered and thus the frame may be raised or lowered. By rotating one of the shafts 14, leaving the other shaft in its normal position, the frame may be laterally inclined to any desired degree and thus made to conform to the contour of the ground or to other circumstances of operation.

Mounted upon the frame 10 and extending in parallel relation to each other and at a slight inclination to the line of draft are a plurality of ground-engaging blades 20. Each of these blades is formed with an angular back 21 whereby the blade is braced and strengthened, and whereby the blade may be attached to the forward and rear members of the frame by means of bolts 22 or in any other suitable manner. As will be seen from Fig. 1, the blades are spaced a uniform distance apart and are so inclined with relation to each other that the rear end of one blade is opposite to and in line with the forward end of the next adjacent blade on one side. It will likewise be seen that these blades are slightly curved so that the cutting edges of the blades will be disposed almost in a horizontal plane and will have a shearing action. These blades act to pulverize the ground, cut beneath the surface thereof, thoroughly break it up, and at the same time cut off any weeds or roots below the surface of the ground. The blades do not simply split or bend over the weeds or roots, but the shearing action of the blades will cut off the roots or weeds.

The tongue 23 is preferably pivotally connected to the frame for movement both in a horizontal plane and in a vertical plane. To this end I mount upon the front bar of the frame the clevis 24 having upper and lower perforated ears, and disposed between these ears is a knuckle 25 through the rear end of which a vertical bolt passes, supporting the knuckle upon the clevis for movement in a horizontal plane. To this knuckle 25 the tongue 23 is pivoted by means of a horizontal bolt for movement in a vertical plane. For the purpose of supporting the tongue in vertical adjustment with relation to the body of the machine, I preferably mount upon the machine an arcuate member 26 which is perforated at intervals, as at 27, the rear end of this arcuate member being mounted upon a bolt 28ª or pin which passes downward through a supporting block mounted on the frame member 10. This pin 28ª has free rotary movement and the arcuate member 26 has free rotary movement in a vertical plane. The free end of the arcuate member passes through a slot 28 and a pin 30 passes through this slot and through any one of the perforations 27. The tongue is longitudinally slotted, as at 29, because of the fact that the tongue and the arcuate member 26 are not pivoted upon the same pivotal axis.

The main frame is braced from the tongue by means of forwardly converging braces 31 formed in two sections connected by means of a turn buckle 31ª, these braces being pivotally connected to eyes 32 formed upon the ends of the frame 10 and also to eyes 33 mounted upon a transverse bolt 34 which passes through the tongue. A clevis 35 supports the double tree or evener bar 36 to which the usual draft appliances are attached. The purpose of the rods 31 is to hold the frame either at right angles to the tongue or at an inclination thereto. The object of providing means whereby the blade supporting frame may be turned into angular relation to the tongue is to give the wheels a chance to crowd toward the cutting edge of the knives instead of away therefrom.

It will be seen that my improved machine may be adjusted vertically so as to vary the depth of the cut of the blades, or may be entirely raised from the ground, and furthermore, that the inclination of the tongue with relation to the frame may be changed, as desired, and that by providing independent means for adjusting either end of the frame I provide for causing the machine to follow the contour of the ground.

My improved cultivator is particularly intended for breaking up and pulverizing the ground and cutting weeds therein. With the disk weed cutter and pulverizer which is ordinarily used for this purpose, the land must be gone over twice in order to cut out the weeds, and even then the weeds are not thoroughly cut out. Furthermore, a disk cultivator throws the land to the outside and leaves it low in the middle. After it has been treated by the disk cultivator the land has to be harrowed and leveled before it is ready to seed. This is not necessary with my cultivator. All the weeds are cut because the cultivator blades overlap, and the soil is thoroughly pulverized. In some portions of the United States the land bakes every spring, and unless the grain comes up in the fall before this baking occurs the grain curls and cannot come up through the crust formed upon the upper surface of the soil. My pulverizer and weed cutter may be used in the fall to break this crust and so let the wheat come up through.

Having thus described my invention, what I claim is:

1. In a machine of the character described, a supporting frame, and a plurality of longitudinally extending parallel cutting blades mounted upon the frame, said blades being disposed at an inclination to the line of draft, each of said blades being downwardly and laterally curved.

2. In a machine of the character described, a supporting frame, a plurality of longitudinally extending parallel cutting blades mounted upon the frame, said blades being disposed at an inclination to the line of draft, each of said blades being downwardly and laterally curved, and the forward end of each blade being approximately in line with the rear end of the next succeeding blade on one side.

In testimony whereof I hereunto affix my signature.

WILLIAM KIDMAN, Jr.

Witness:
J. C. WALTERS.

Copies of this patent may be obtained for five cents each, by addressing the "Commissioner of Patents, Washington, D. C."